(12) United States Patent
Wendel et al.

(10) Patent No.: US 10,776,938 B2
(45) Date of Patent: *Sep. 15, 2020

(54) CAMERA SYSTEMS USING FILTERS AND EXPOSURE TIMES TO DETECT FLICKERING ILLUMINATED OBJECTS

(71) Applicant: Waymo LLC, Mountain View, CA (US)

(72) Inventors: Andreas Wendel, Mountain View, CA (US); Benjamin Ingram, Santa Clara, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/567,221

(22) Filed: Sep. 11, 2019

(65) Prior Publication Data

US 2020/0005477 A1    Jan. 2, 2020

Related U.S. Application Data

(63) Continuation of application No. 15/613,546, filed on Jun. 5, 2017, now Pat. No. 10,453,208.

(Continued)

(51) Int. Cl.
    *G06T 7/593* (2017.01)
    *G06K 9/00* (2006.01)
    (Continued)

(52) U.S. Cl.
    CPC .......... *G06T 7/593* (2017.01); *B60W 30/095* (2013.01); *G05D 1/0212* (2013.01);
    (Continued)

(58) Field of Classification Search
    USPC ....................................... 382/104
    See application file for complete search history.

(56) References Cited

U.S. PATENT DOCUMENTS 5,070,407 A    12/1991   Wheeler et al.
7,031,496 B2    4/2006   Shimano et al.
(Continued)

FOREIGN PATENT DOCUMENTS

CN        102540628 A    7/2012
CN        103259976 A    8/2013
(Continued)

OTHER PUBLICATIONS

"International Search Report and Written Opinion received for PCT Patent Application No. PCT/US2018/032016, dated Nov. 1, 2018", 15 pages.

(Continued)

*Primary Examiner* — Ishrat I Sherali
(74) *Attorney, Agent, or Firm* — Botos Churchill IP Law

(57) ABSTRACT

The technology relates to camera systems for vehicles having an autonomous driving mode. An example system includes a first camera mounted on a vehicle in order to capture images of the vehicle's environment. The first camera has a first exposure time and being without an ND filter. The system also includes a second camera mounted on the vehicle in order to capture images of the vehicle's environment and having an ND filter. The system also includes one or more processors configured to capture images using the first camera and the first exposure time, capture images using the second camera and the second exposure time, use the images captured using the second camera to identify illuminated objects, use the images captured using the first camera to identify the locations of objects, and use the identified illuminated objects and identified locations of objects to control the vehicle in an autonomous driving mode.

19 Claims, 9 Drawing Sheets

Related U.S. Application Data

(60) Provisional application No. 62/508,467, filed on May 19, 2017.

(51) Int. Cl.
  G06K 9/20 (2006.01)
  B60W 30/095 (2012.01)
  G05D 1/02 (2020.01)
  G06K 9/32 (2006.01)

(52) U.S. Cl.
  CPC ......... *G06K 9/00825* (2013.01); *G06K 9/209* (2013.01); *G06K 9/3241* (2013.01)

(56) References Cited

U.S. PATENT DOCUMENTS

| | | | |
|---|---|---|---|
| 9,086,486 | B2 | 7/2015 | Gilliland et al. |
| 9,420,151 | B2 | 8/2016 | Yokota |
| 10,453,208 | B2 * | 10/2019 | Wendel ................. G06K 9/209 |
| 2001/0038414 | A1 | 11/2001 | Hofer et al. |
| 2007/0085912 | A1 | 4/2007 | Hakola et al. |
| 2007/0188653 | A1 | 8/2007 | Pollock et al. |
| 2008/0029701 | A1 | 2/2008 | Onozawa et al. |
| 2009/0096937 | A1 | 4/2009 | Bauer et al. |
| 2012/0314069 | A1 | 12/2012 | Taylor |
| 2014/0098997 | A1 * | 4/2014 | Faber ................... H04N 5/2357 382/103 |
| 2014/0232900 | A1 | 8/2014 | Wernersson |
| 2014/0267622 | A1 | 9/2014 | Kasahara |
| 2014/0354811 | A1 | 12/2014 | Weber |
| 2015/0077581 | A1 | 3/2015 | Baltz et al. |
| 2015/0341620 | A1 | 11/2015 | Han et al. |
| 2015/0350510 | A1 | 12/2015 | Han |
| 2017/0085912 | A1 | 3/2017 | Knee et al. |
| 2018/0139368 | A1 | 5/2018 | Nakayama |
| 2019/0208111 | A1 * | 7/2019 | Wendel ................ H04N 5/2258 |
| 2019/0243376 | A1 * | 8/2019 | Davis .................. H04N 5/2351 |

FOREIGN PATENT DOCUMENTS

| | | | | |
|---|---|---|---|---|
| JP | H09126758 | A | 5/1997 | |
| JP | 2009512383 | A | 3/2009 | |
| WO | 2016104235 | A1 | 6/2016 | |
| WO | WO-2016104235 | A1 * | 6/2016 | ............. G03B 35/08 |
| WO | 2016180874 | A1 | 11/2016 | |
| WO | 2018213092 | A1 | 11/2018 | |

OTHER PUBLICATIONS

Young, Nicole S, "Getting Started with Long Exposure Photography and Neutral Density Filters", Available online at: <https://photofocus.com/2014/08/19/getting-started-with-long-exposure-photography-and-nd-filters/>, Aug. 19, 2014, 17 pages.

Korean Notice of Allowance for Application No. 10-2019-7033412 dated Dec. 2, 2019.

Republic of Korea Notice of Preliminary Rejection for Application No. 10-2020-7006116 dated Mar. 10, 2020.

Singapore Search Report and Written Opinion for Application No. 11201909989P dated Apr. 7, 2020.

Chinese Office Action for Application No. 201880032307.6 dated Jun. 9, 2020.

Japanese Office Action for Application No. 2019559719 dated Jun. 18, 2020.

\* cited by examiner

CAMERA SYSTEMS USING FILTERS AND EXPOSURE TIMES TO DETECT FLICKERING ILLUMINATED OBJECTS

CROSS-REFERENCE TO RELATED APPLICATIONS

The present application is a continuation of U.S. patent application Ser. No. 15/613,546, filed Jun. 5, 2017, which claims the benefit of the filing date of U.S. Provisional Patent Application No. 62/508,467 filed May 19, 2017, the disclosures of which are hereby incorporated herein by reference.

BACKGROUND

Autonomous vehicles, such as vehicles that do not require a human driver, can be used to aid in the transport of passengers or items from one location to another. Such vehicles may operate in a fully autonomous driving mode where passengers may provide some initial input, such as a destination, and the vehicle maneuvers itself to that destination. Thus, such vehicles may be largely dependent on systems that are capable of determining the location of the autonomous vehicle at any given time, as well as detecting and identifying objects external to the vehicle, such as other vehicles, stop lights, pedestrians, etc.

While such sensors come in many different configurations, as an example, such sensors may include ("light detection and ranging") LIDAR sensors, radar units, cameras, etc. In the camera example, in addition to configuration, the cameras have various features such as gain, exposure time, etc. which must be set to particular values in order to obtain useful images. Typically, the exposure time is determined by algorithms based on the ambient lighting conditions and brightness of the lights to be detected. As such, these exposure times are often very short, for instance, on the order of microseconds. However, in the case of illuminated objects, while the human eye may see a solid continuous light, in actuality many illuminated objects actually flicker depending upon the frequency of the power grid (for instance, at 60 Hz) or whether the light (such as a light emitting diode (LED)) utilizes "pulse-width modulated light" (PWM). If these cameras were to sample something that has a short light pulse, then the likelihood of imaging that light pulse within a timespan of a few microseconds is low.

BRIEF SUMMARY

Aspects of the disclosure provide a system. The system includes a first camera mounted on a vehicle in order to capture images of the vehicle's environment, the first camera having a first exposure time and being without an ND filter; a second camera mounted on the vehicle in order to capture images of the vehicle's environment, the second camera having a second exposure time that is greater than or equal to the first exposure time and having an ND filter; and one or more processors. The one or more processors are configured to capture images using the first camera and the first exposure time; capture images using the second camera and the second exposure time; use the images captured using the second camera to identify illuminated objects; use the images captured using the first camera to identify the locations of objects; and use the identified illuminated objects and identified locations of objects to control the vehicle in an autonomous driving mode.

In one example, the first camera and the second camera each include a near infrared filter. In another example, the second exposure time is on the order of milliseconds. In this example, the second exposure time is at least 5 milliseconds and the first exposure time is no greater than 5 milliseconds. In another example, the ND filter is selected according to the second exposure time. In another example, the ND filter is implemented at a pixel level for the second camera. In another example, the system also includes the vehicle. In another example, the one or more processors are configured to use the images of the second camera to identify illuminated images by identifying light from a PWM light source. In another example, the one or more processors are configured to use the images of the second camera to identify illuminated images by identifying text generated by a plurality of PWM light sources comprising LEDs. In this example, the one or more processors are further configured to select the second exposure time based on a frequency of the PWM light sources. In another example, the one or more processors are configured to use the images of the second camera to identify illuminated images by identifying light from a light source which flickers at a rate defined by a power grid that supplies power to the light source. In this example, the one or more processors are further configured to select the second exposure time based on a rate defined by the power grid. In another example, the second exposure time is a fixed exposure time. In another example, the first exposure time is a variable exposure time that is adjusted according to ambient lighting conditions. In this example, the second exposure time is always greater than the first exposure time. In addition or alternatively, the second exposure time is a variable exposure time.

Another aspect of the disclosure provides a camera for use on a vehicle. The camera includes a set of photodiodes, an ND filter arranged to filter light before the light reaches the set of photodiodes, and a controller configured to expose the set of photodiodes using a fixed exposure time of at least 5 milliseconds in order to capture an image, wherein the exposure time allows the camera to capture light from a PWM light source during the exposure time, the PWM light being located in an environment of the vehicle. In one example, the camera also includes a near-infrared filter arranged to filter light before the light reaches the set of photodiodes.

A further aspect of the disclosure provides camera for use on a vehicle. The camera includes a set of photodiodes; an ND filter arranged to filter light before the light reaches the set of photodiodes; and a controller configured to expose the set of photodiodes using a fixed exposure time of at least 5 milliseconds in order to capture an image, wherein the exposure time allows the camera to capture light from a light source which flickers at a rate defined by a power grid that supplies power to the light source, the light source being located in an environment of the vehicle. In one example, the camera also includes a near-infrared filter arranged to filter light before the light reaches the set of photodiodes.

DETAILED DESCRIPTION

Figure 1:
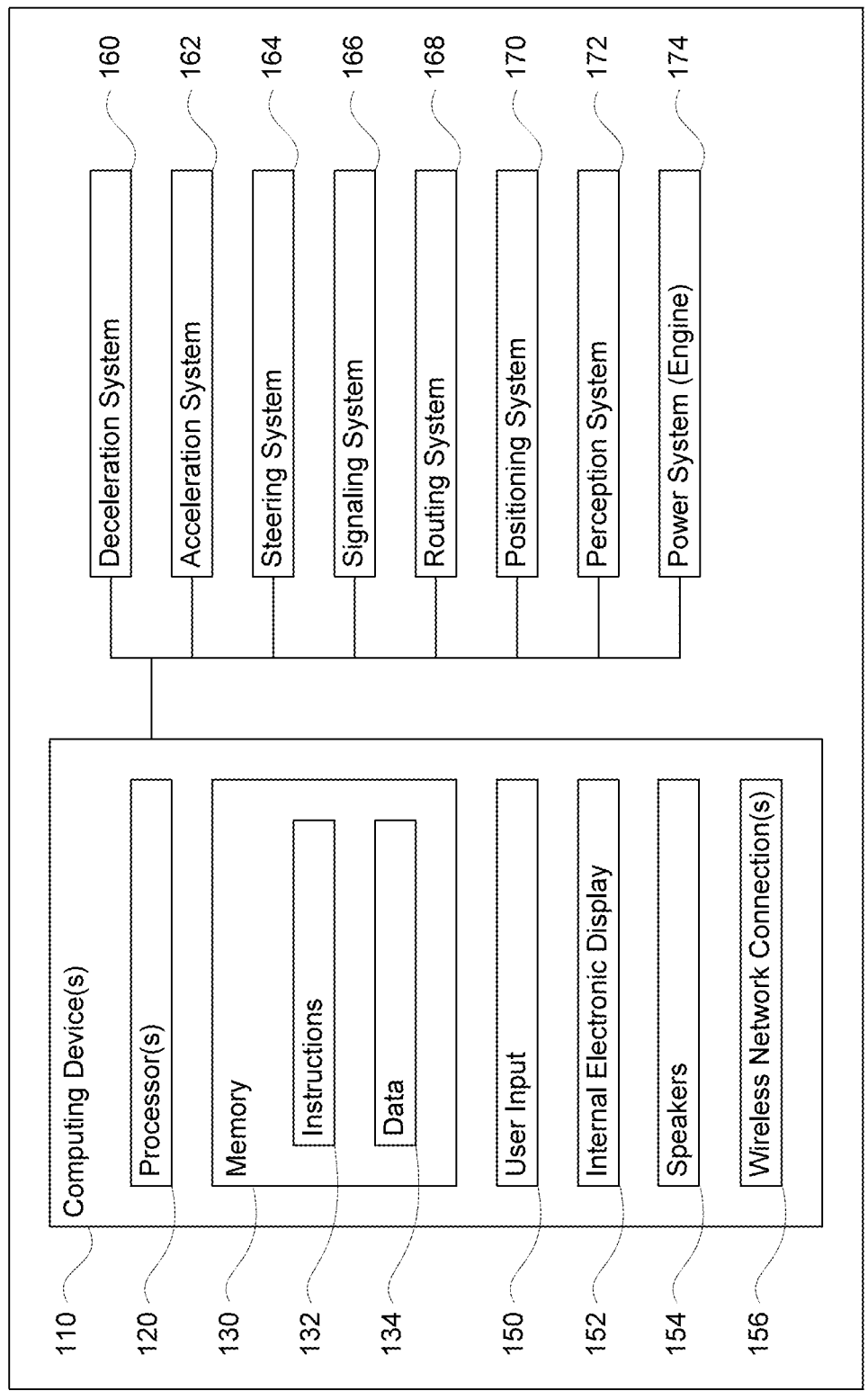
FIG. 1 is a functional diagram of an example vehicle in accordance with aspects of the disclosure according to aspects of the disclosure.

The technology relates to controlling a vehicle, for instance in an autonomous driving mode, based on information detected in the vehicle's surroundings. As an example, such information may be detected using one or more cameras mounted on the vehicle. As noted above, generally such cameras use very short exposure times when the light in the scene is strong, so that the scene is not over-exposed (some or all colors saturate, distorting color, or parts of the image just being white) and also rapidly adjust the camera configuration in order to best capture ambient lighting conditions. However, in the case of illuminated objects, while the human eye may see a solid continuous light, in actuality many illuminated objects actually flicker depending upon the frequency of the power grid or whether the light utilizes PWM. If these cameras were to sample something that has a short light pulse, or rather a pulse having both a brief period of being on with a longer period of being off during a very short amount of time as discussed below, then the likelihood of imaging that light pulse within a timespan of a few microseconds is low.

To address this problem, the exposure time of one or more of the cameras may be adjusted to a period which would be sufficient enough to cover the period of both the power grid as well as PWM lights, such as those used for brake lights, turn signals, reverse lights, some headlights and daytime running lights, as well as LED informational road signs (e.g. construction information signs, variable speed limit signs, variable direction-of-traffic signs, etc.).

As an example, brake lights are especially likely to PWM because they often have two brightness settings, one for tail lights (on for long periods) then a more intense one for brake lights (on while the vehicle is braking). The change in intensity may be implemented by using different PWM duty cycles. In addition the camera may be fitted with a filter that drastically reduces the amount of light reaching the lens such as a neutral density (ND) optical filter or other darkening filter that cuts light significantly, such as those that adds color tint and thus are not necessarily "neutral". Thus, any of the examples below using an ND filter may be replaced with such darkening filters.

The filter used may be selected in order to reach a balanced amount of light for a particular exposure time. Such filters may help to make this timespan much longer and thus the likelihood of imaging the aforementioned short pulses increases dramatically.

This combination of features allows the one or more cameras with the ND filters and longer exposure times to capture images which are closer to what a human eye would see. As such, the images captured by the camera with the ND filter and the exposure time may be more reliable for identifying traffic signal lights, brake lights, or turn signals that flicker at speeds which are indiscernible to the human eye, than images captured with other cameras without these features. This in turn, would make identifying illuminated objects a much simpler task and avoid situations where flickering lights would be incorrectly identified as not being illuminated. Moreover, some of the images may be taken by two different cameras at the same time, making aligning the images and matching objects between them, etc. significantly simpler to do. Of course, this information may then be used to control the vehicle.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing devices 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing devices 110 may be an autonomous driving computing system incorporated into vehicle 100. The autonomous driving computing system may capable of communicating with various components of the vehicle in order to maneuver vehicle 100 in a fully autonomous driving mode and/or semi-autonomous driving mode. For example, returning to FIG. 1, computing devices 110 may be in communication with various systems of vehicle 100, such as deceleration system 160, acceleration system 162, steering system 164, signaling system 166, navigation system 168, positioning system 170, perception system 172, and power system 174 (for instance, a gasoline or diesel powered motor or electric engine) in order to control the movement, speed, etc. of vehicle 100 in accordance with the instructions 132 of memory 130. Again, although these systems are shown as external to computing devices 110, in actuality, these systems may also be incorporated into computing devices 110, again as an autonomous driving computing system for controlling vehicle 100.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways. In addition, this map information may include information regarding traffic controls, such as traffic signal lights, stop signs, yield signs, etc., which, in conjunction with real time information received from the perception system 172, can be used by the computing devices 110 to determine which directions of traffic have the right of way at a given location.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, microphones, radar units, cameras and/or any other detection devices that record data which may be processed by computing devices 110. The sensors of the perception system may detect objects and their characteristics such as location, orientation, size, shape, type, direction and speed of movement, etc. The raw data from the sensors and/or the aforementioned characteristics can be quantified or arranged into a descriptive function or vector and sent for further processing to the computing devices 110. As discussed in further detail below, computing devices 110 may use the positioning system 170 to determine the vehicle's location and perception system 172 to detect and respond to objects when needed to reach the location safely.

Figure 2:
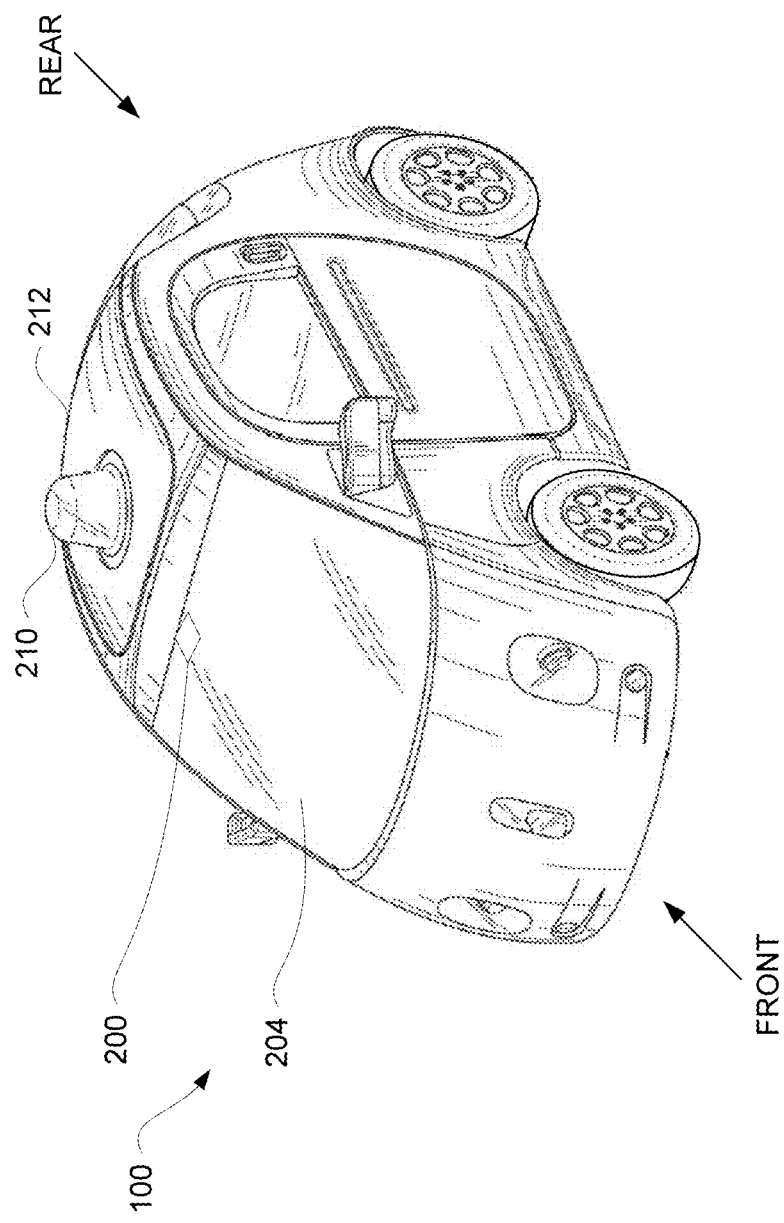
FIG. 2 is an example external view of the example vehicle of FIG. 1 in accordance with aspects of the disclosure.

FIG. 2 is an example external view of a vehicle 100. As indicated above, the perception system 172 may include one or more sensors, such as one or more cameras, which may be mounted on the vehicle at various locations. In this example, camera 200 (which may represent multiple cameras) is mounted just behind a front windshield 204 of the vehicle. This placement allows the cameras to capture a significant portion of the environment of the front of the vehicle. In addition, housing 210 located on the roof panel 212 of the vehicle 100 may house one or more additional cameras mounted within the housing. Cameras within the housing may be oriented at different directions in order to capture images in the front of the vehicle, rear of the vehicle, and/or "driver" and "passenger" sides of the vehicle.

Figures 3A, 3B:
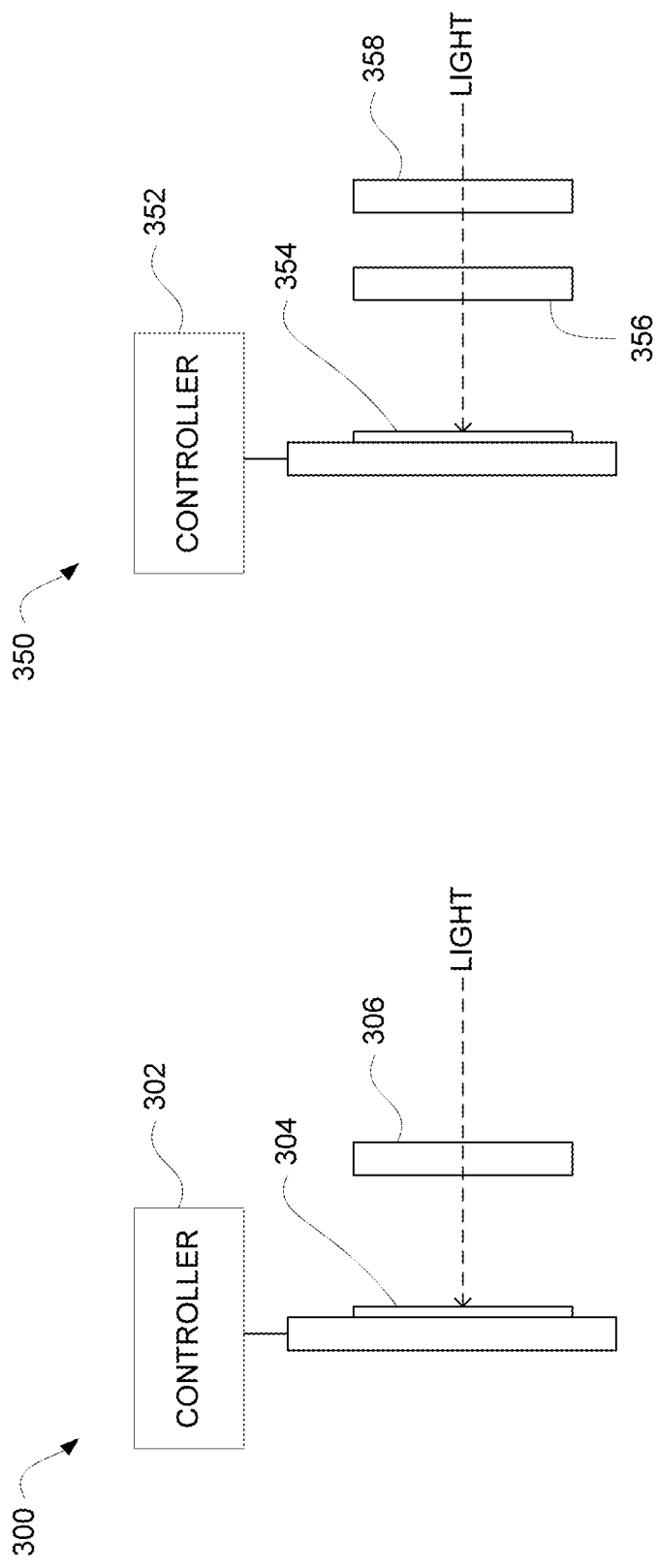
FIG. 3A is an example functional diagram of a first camera in accordance with aspects of the disclosure.
FIG. 3B is an example functional diagram of a second camera in accordance with aspects of the disclosure.

FIGS. 3A and 3B are example functional diagrams of cameras 300 and 350 of perception system 172. One or both of cameras 300, 350 may be located at any one of the positions of camera 200 or within housing 210. As shown, camera 300 includes a controller 302 which may include one or more processors, configured similarly to processors 120, which may communicate and control operation of a set of photodiodes 304. In this configuration, light entering the camera passes through one or more filters before reaching the photodiodes 304. In this example, a filter 306 may be a near infrared filter in order to block or filter wavelengths at or close to infrared light. Other additional filters may also be used.

Operation of camera 300 may enable the perception system 172 to capture images of the vehicle's surroundings as well as process and identify non light emitting objects as well as light emitting objects. As noted above, in order to provide the perception system 172 with the most useful images of such objects, the exposure time of the camera 300 may be selected to be very short. For instance, during typical daylight hours, the ambient lighting when capturing images using camera 300 is generally very bright, so the exposure time that is chosen is typically very short or on the order of microseconds, for instance 1 to 50 microseconds.

Figure 4:
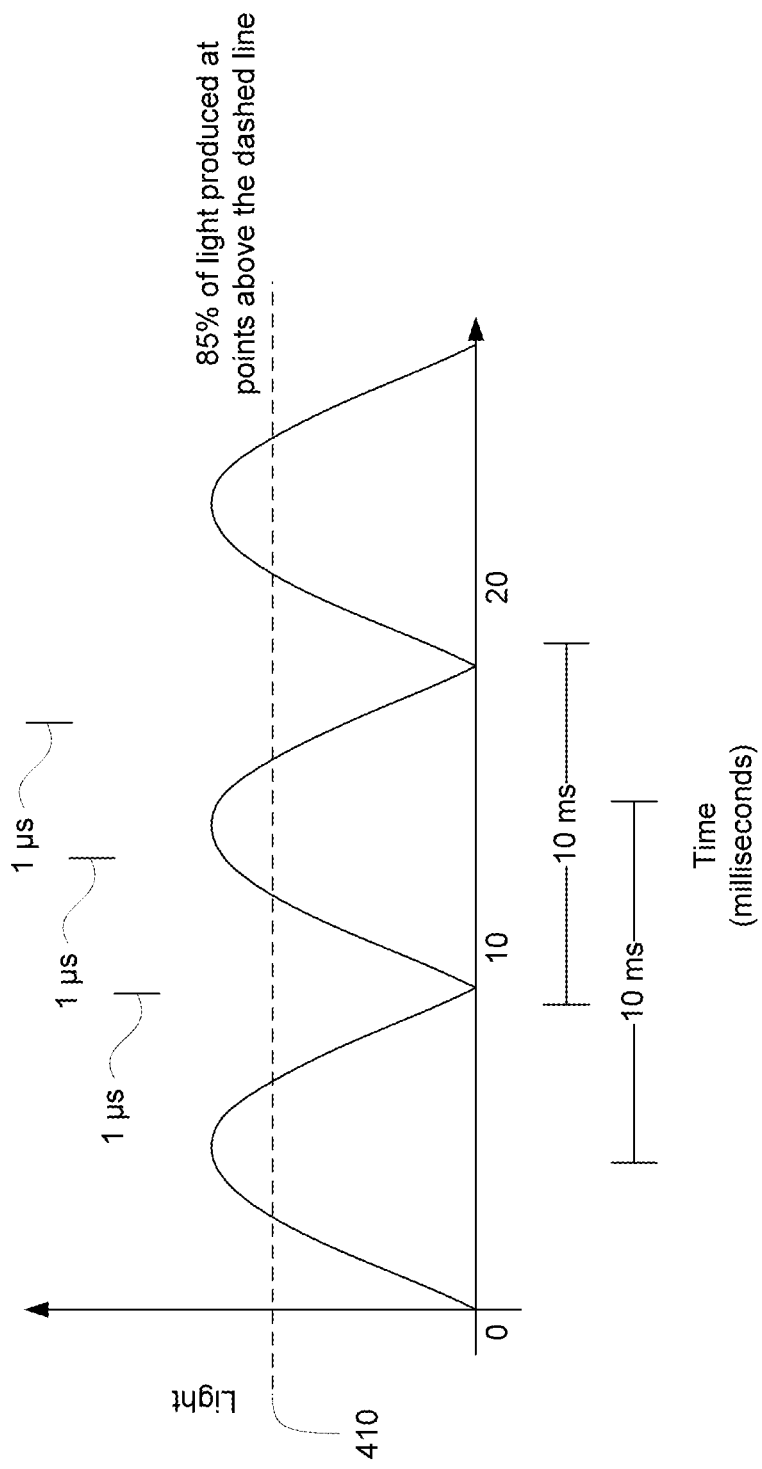
FIG. 4 is an example chart of representative exposure times and light pulses in accordance with aspects of the disclosure.

In some instances, the camera 300 may be used to capture both "light" exposure images and "dark" exposure images in order to allow the perception system 172 and/or the computing devices 110 to identify both non-emissive (using the light exposure image) and light emissive objects dark exposure image. To do so, a first image is processed by the controller 302 to determine an exposure value for capturing the average amount of light (within a predetermined range) in the environment, for instance using a logarithmic control for shutter time and a linear control for the gain value. This exposure value is then used to capture the light exposure image. A fixed offset value may then be added (or used to multiply) to one or more camera settings such as shutter time and gain in order to use the same camera to capture the dark exposure image. This process may continue such that the camera is used to capture a series of light and dark exposure images as shown in the example of FIG. 4 discussed further below. Accordingly, the exposure time of the camera 300 is variable according to the ambient lighting conditions, and may, for instance, range from as little as a few microseconds to few milliseconds, for instance, up to 10 milliseconds. This upper bound limit may be useful in order to limit motion blur caused by the camera being used on a moving vehicle.

As noted above, if the camera 300 is attempting to sample an image of an object that has a very short light pulse, then the likelihood of imaging that light pulse within a timespan of a few microseconds is low. For instance, using the example of a traffic light or any light powered by the power grid in the US, the power grid frequency would be 60 Hz (16.66 ms) with two half-periods of 8.33 ms in which the traffic light is at its maximum in the middle of the cycle. In other words, there is a maximum light event every 8.33 milliseconds as shown in the example plot of FIG. 4. In addition, more than 85% of the light is produced during 25% of the cycle (for example that part of the light pulse above dashed line 410). Thus, with an exposure on the order of a microsecond, the likelihood of capturing an image of the traffic light at the maximum or during some portion of the cycle which would provide enough light is very low, for instance, approximately 25% of the time which would be insufficient and inefficient for the purposes of safely controlling a vehicle in an autonomous driving mode. As such, camera 350, discussed further below, may also be used to capture such pulsed illuminated lights.

As with lights that flicker according to the power grid frequency, PWM lights can also be difficult to discern with short exposure times. As noted above, LEDs, which are PWM, are commonly used in brake lights, turn signals, reverse lights, some headlights and daytime running lights, as well as LED informational road signs (e.g. construction information signs, variable speed limit signs, variable direction-of-traffic signs, etc.) as well as various other types of lights which may be encountered by the perception system. For instance, PWM lights also have very short light pulses, typically operating at frequencies of about 100-110 Hz with on-fractions of approximately 10% (though such frequencies can vary widely from 80 to 400 Hz with duty cycles from less than 10% to 80%). As an example, if a brake light uses a frequency of 100 Hz with 10% on-fraction as shown in the example plot of FIG. 5, a pulse of 1 millisecond of light is emitted, followed by 9 milliseconds of no light, then another 1 millisecond of light, 9 milliseconds of no light, and so on. Thus, depending upon when camera 300 captures an exposure, during 1 millisecond the light will appear on in the image, and in the next 9, there will be no light from the brake light. Again, this makes determining the state of a brake light from single or small set of images difficult and in some cases impossible. As such, camera 350 may also be used to capture such pulsed illuminated lights.

This can be especially problematic where the camera 300 is capturing an image of a light up road sign which includes text formed from LEDs. The text in images captured by camera 300 would only be partially visible during the exposure, and making it extremely difficult to identify the text from a single image or even by combining a series of images captured over time. This is because many signs that use LEDs for text have different portions of the text lit for a different parts of the PWM cycle. In other words, one subset of LEDs may be lit in a first 10% of cycle, another subset in a second 10% of the cycle, and so on. As such, only 1/10 of the text is illuminated at any given time.

Figure 6A:
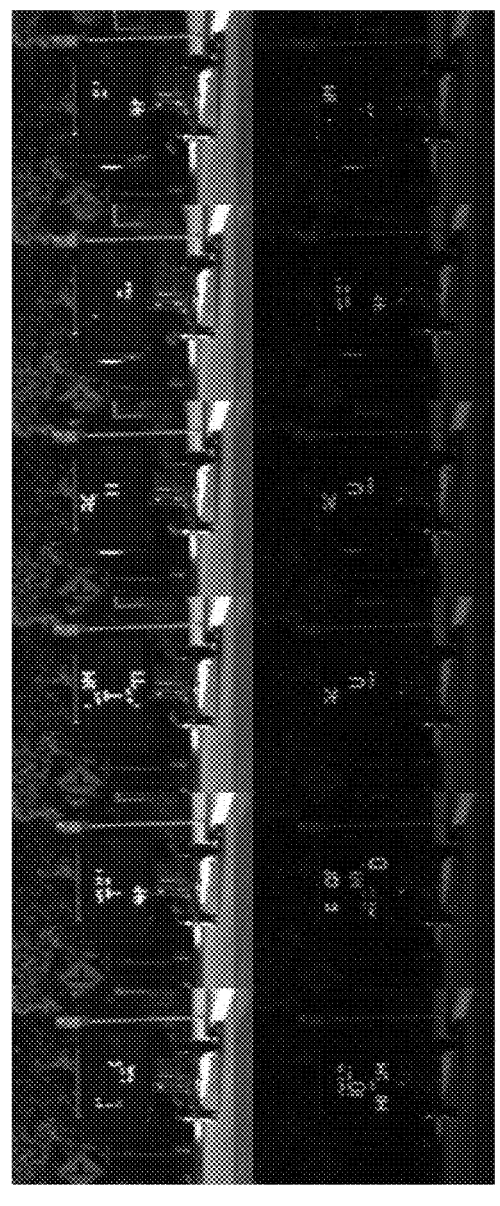
FIG. 6A is an example series of images captured by the first camera in accordance with aspects of the disclosure.

For example, FIG. 6A demonstrates how a short exposure time, on the order of microseconds used for fairly bright daylight ambient lighting conditions, can cause lighted signs with text that use PWM lights to be incoherent and impossible to decipher by the vehicle's perception system 172 and/or computing devices 110. In this example, a series of 12 images captured by a camera configured similarly to camera 300 (with short exposure time and no ND filter) depicts a traffic sign with text formed from illuminated PWM lights, here LEDs. As discussed in the example above, the top 6 images are captured as light exposure images 602 in order to identify non emissive objects, while the lower 6 images are captured as dark exposure images 604 in order to identify emissive objects. However, as can be seen, while it is clear that the sign is illuminated, the text is incoherent. As such, camera 350 may also be used to capture such pulsed illuminated lights.

As shown in FIG. 3B, camera 350 includes a controller 352, comparable to controller 302, that may communicate and control operation of a set of photodiodes 354. In this configuration, light entering the camera passes through one or more filters before reaching the photodiodes 304. In this example, a first filter 356 may be a near infrared filter in order to block or filter wavelengths at or close to infrared light, and a second filter 358 may be an ND filter. The ND filter may be selected in order to tune the exposure time of the camera to a particular time frame. For instance, in order to achieve a 10 millisecond exposure time for camera 350, a ~1% ND filter may be used. This allows the camera 350 to effectively increase the exposure time from camera 300 approximately 100 times or more or less while still providing useful images of the vehicle's environment. In this regard, the exposure time desired may be used to determine the type of ND filter.

Figure 7B:
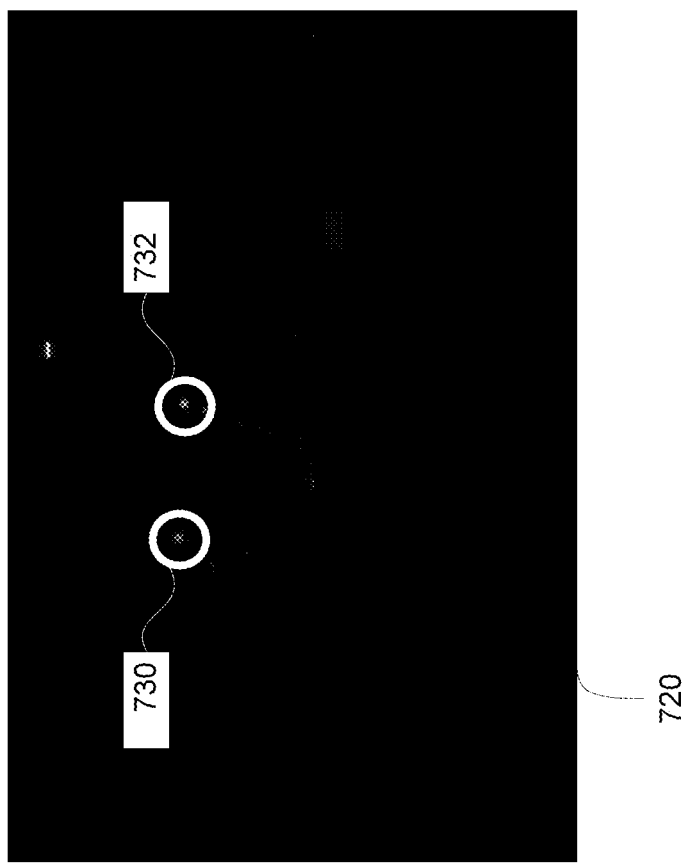
FIGS. 7A and 7B are example images of traffic signal light in accordance with aspects of the disclosure.
Figure 7A:
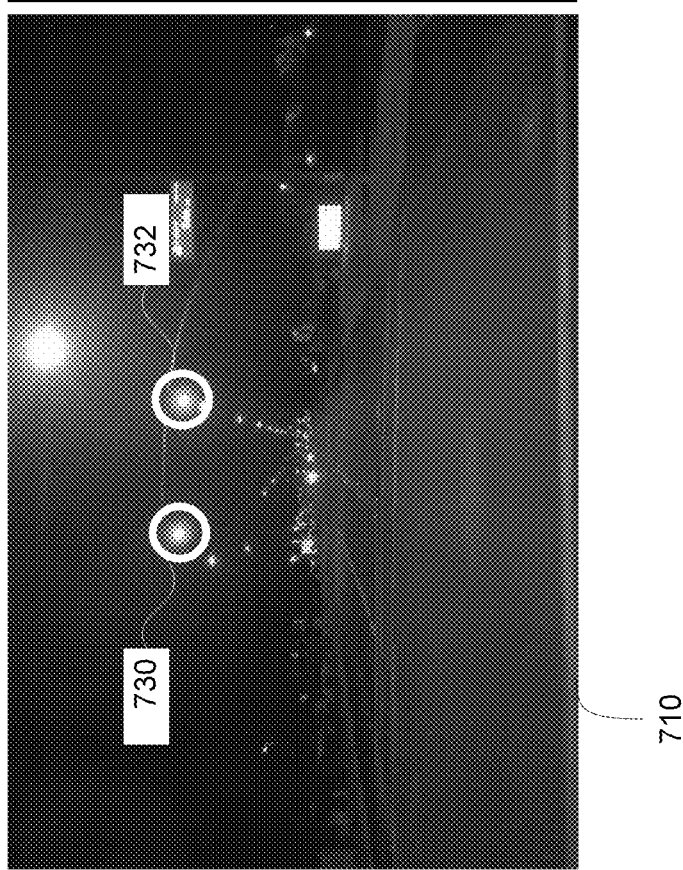

Using an ND filter allows for a longer exposure time by filtering out additional light. In other words, the exposure time of camera 350 may be much greater than camera 300 while still capturing useful images of objects. As an example, the exposure time can be on the order of milliseconds, such as for instance 1 to 20 milliseconds or times therebetween, such as at least 5 or 10 milliseconds. FIGS. 7A and 7B demonstrate the same image of a pair of traffic signal lights 730, 732 that are both illuminated in the color green using a longer exposure time, for instance, on the order of milliseconds. Image 710 of FIG. 7A is captured without an ND filter while image 720 of FIG. 7B is captured with an ND filter, for instance using a camera configured similarly to camera 350. Each of the traffic signal lights 730, 732 is identified by a white circle for ease of understanding, although these circles are not part of the images themselves. As can be seen, the images 710 and 720 demonstrate how the use of the ND filter eliminates most of the other information (or other light), allowing the viewer, and the vehicle's perception system 172, to pick out the illuminated traffic lights more readily. Although not visible from black and white images, the ND filter also preserves the light's color. For example, in image 710, the traffic signal lights appear white with green halo, while in image 720, the traffic signal lights appear as green circles.

Figure 5:
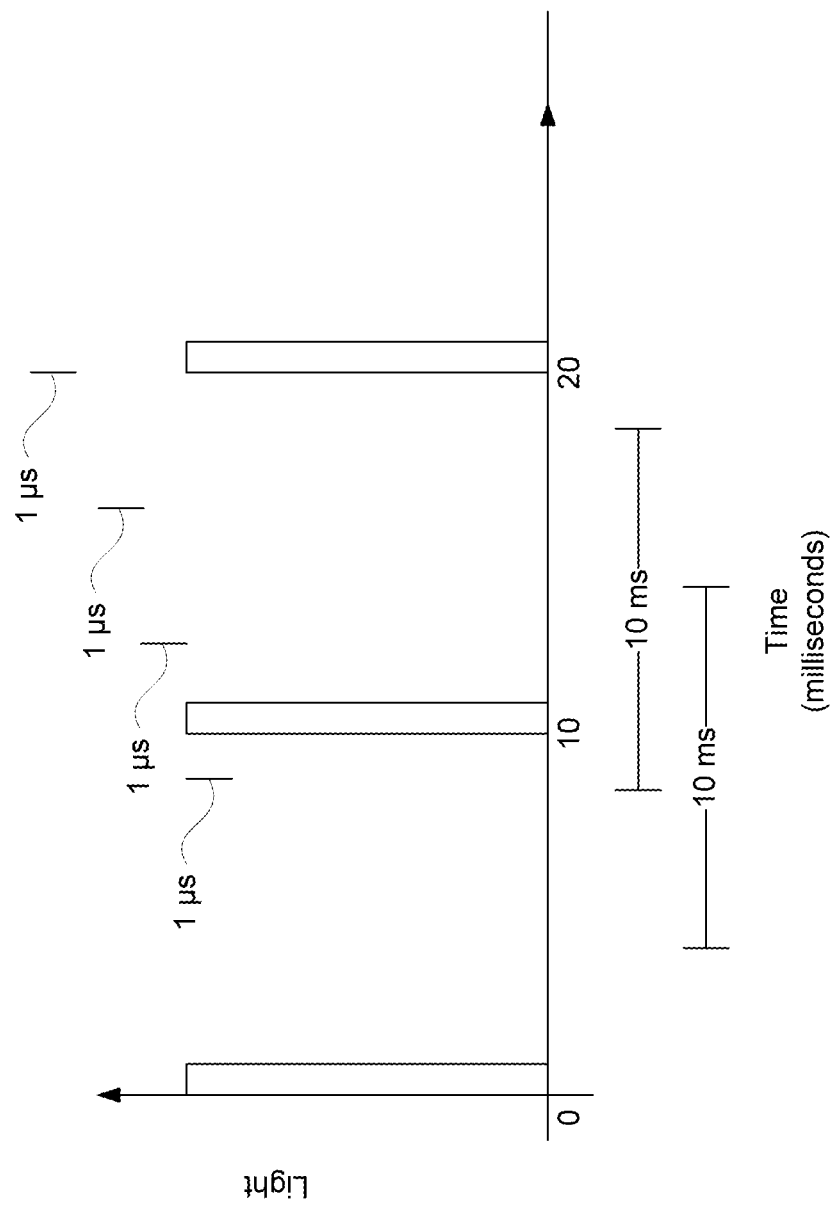
FIG. 5 is another example chart of representative exposure times and light pulses in accordance with aspects of the disclosure.

Returning to the example of the power grid traffic light, where there is a maximum light event every 8.33 milliseconds and where camera 350's exposure time is 10 milliseconds, the camera 350, using a 10 millisecond exposure time, is likely to capture an illuminated traffic light very well as shown in FIGS. 4, 7A and 7B. No matter where a 10 ms exposure time begins (shown by the different 10 millisecond example exposure times), the camera 350 is able to capture a significant amount of the light, and the ND filter removes other information (or additional light) not needed for identifying the traffic signal light. Similarly, in the example of a PWM brake light, where the brake light pulses at 100 HZ with a 10% on-fraction, the camera 350, using a 10 millisecond exposure time, is likely to capture an illuminated brake light as shown in FIG. 5. Thus, the likelihood of imaging the aforementioned types of illuminated lights increases significantly.

Figure 6B:
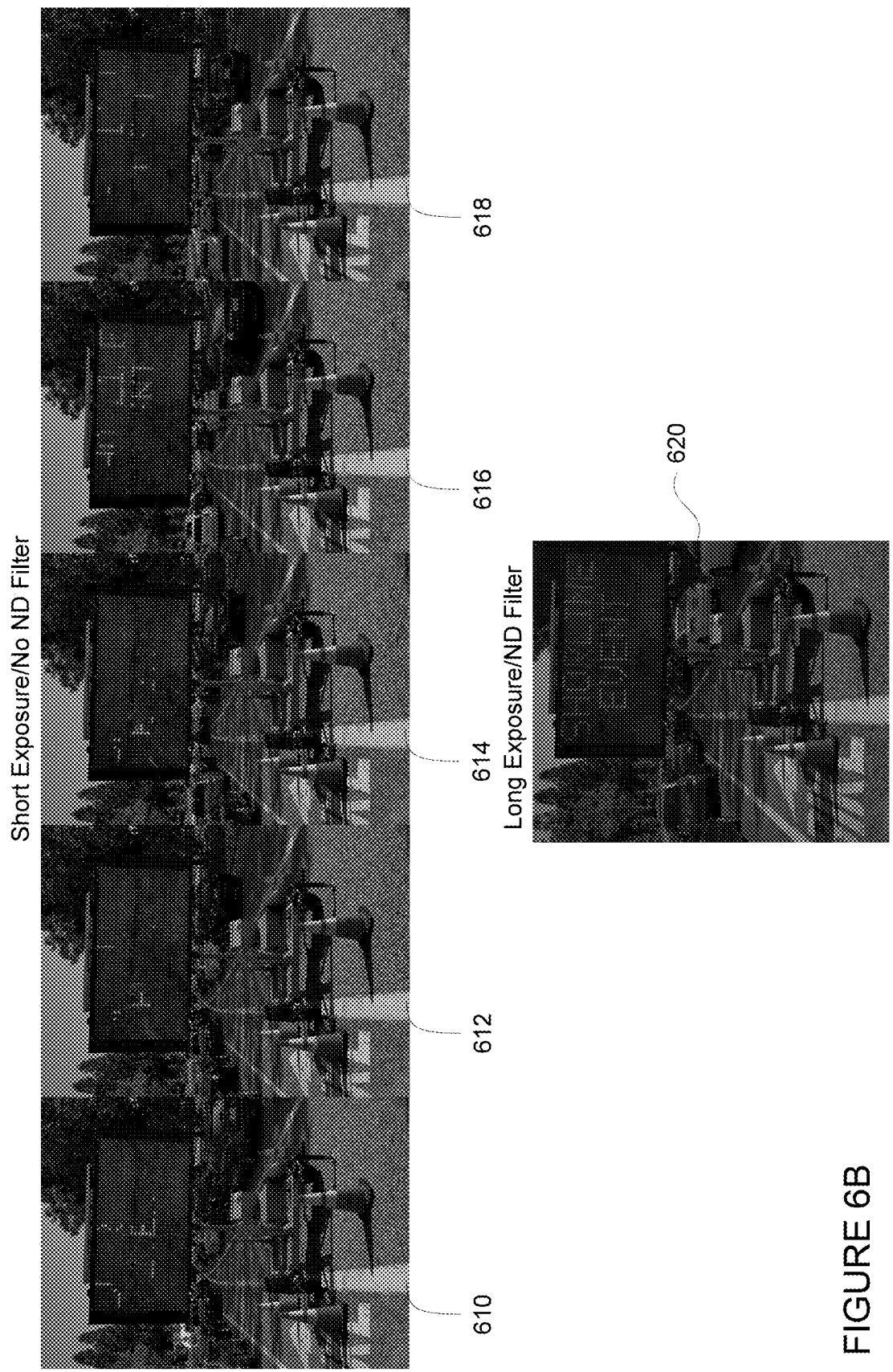
FIG. 6B is an example of images of a sign captured by the first camera and an image of the sign captured by the second camera in accordance with aspects of the disclosure.

FIG. 6B demonstrates a comparison between images of a lighted sign with text that use PWM lights captured without an ND filter and using a short exposure time, on the order of microseconds, and an image of that same sign captured with an ND filter using a longer exposure time, on the order of milliseconds. Each of the images 610-618 and 620 depict the same traffic sign having text formed by illumined PWM lights, here LEDs. As with the example of FIG. 6A, images 610-618 of the traffic sign captured under fairly bright daylight ambient lighting conditions with no ND filter and a short exposure time can cause such traffic signs to be incoherent and impossible to decipher by the vehicle's perception system 172 and/or computing devices 110. Again, images 610-618 may have been captured by a camera configured similarly to camera 300 with a shorter exposure time, on the order of microseconds, and no ND filter. While it is clear that the lights of the sign are at least partially illuminated, the text is incoherent. Image 620 may have been captured by a camera configured similarly to camera 350 with an ND filter and a longer exposure time, again on the order to milliseconds. In the example of image 620, the text of the sign is clearly legible and therefore more likely to be deciphered by the vehicle's perception system, for instance using OCR or other techniques discussed below.

The ND filter may be implemented as a variable ND filter. For instance, the ND filter may be electrically-controllable semi-transparent LCD.

As an alternative to camera 350's configuration with an ND filter, the aperture and/or lense of the camera 350 may be reduced. For instance, camera 300 may have an f/2 aperture and no ND filter (where f refers to focal length). However, instead of camera 350 having an f/2 aperture and ND filter, such as an ND64 filter, camera 350 may have an f/16 aperture. The f/16 aperture has an 8 times smaller diameter (or 16/2), which is 64 times (or 8^2) less area and thus allows for 64 times less light transmission. Accordingly, this would act similarly to the ND64 filter.

In addition or alternatively, an aperture stop may be used. The smaller aperture, lens, and/or aperture stop may provide a better depth of field so that far and near things are simultaneously in focus. The small aperture camera may also be used with or without a darkening filter such as an ND filter.

Although the filters described above are depicted as lenses which filter light for all of the photodiodes at one, other filter configurations may also be used. For example, the filters may be implemented at the pixel level. In this regard, different groups of photodiodes within the same camera may be configured with different filter configurations, such that a single camera includes filters configurations which would allow for the configurations of both cameras 300 and 350 at the same time.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As the vehicle moves along, the sensors of the perception system 172 may sample the vehicle's environment. Referring to cameras 300 and 350, in order to produce sensor data for processing by the computing devices 110, controllers 302 and 352 may control the functioning of the respective cameras. In this regard, the controllers may cause each of the cameras to capture images of the vehicle's environment using variable or fixed exposure times.

In the case of camera 300, this exposure time may be determined based on the ambient lighting conditions as discussed above. For instance, the exposure time of the first camera may be on the order of microseconds (such a 1, 45, 80, 100, 500, or just under 1 millisecond or times therebetween) and up to as long as 10 milliseconds depending upon the ambient lighting conditions as discussed above. Thus, the camera 300 may capture images of the vehicle's environment sequentially, and in some cases by switching between dark and light exposures, using a variable exposure time tied to the ambient lighting conditions.

In the case of camera 350, this exposure time may be predetermined based on the type of ND filter used. As in the example above, for a ~1% ND filter, the exposure time of the camera 350 may be set to 10 milliseconds. Thus, the camera 350 may capture images of the vehicle's environment sequentially using a 10 millisecond exposure time. However, unlike the variable exposure time of camera 300, the exposure time of camera 350 may be a fixed value. In other examples, the exposure time of camera 350 may be varied, but still longer than the exposure time of camera 300, for instance, to increase the likelihood of capturing a non-flickering traffic light when there is sun glare nearby.

The images captured by the cameras may then be processed to identify objects in the vehicle's environment using various known techniques such as, for example, Training a deep net classifier or using a different machine learning technique such as cascade classifiers or support vector machines (SVM), matching a known pattern, extracting local features and matching them against a model, segmenting the image to find an object, matching a certain color, blob detection, comparing gradient images or histograms, etc. For instance, the images from camera 300 may be used to identify the location of objects, such as road markings (for instance, lane lines or other markers), other road users (for instance, vehicles, bicyclists, pedestrians, etc.), signs (for instance, stop signs, speed signs, construction signs, etc.), cones, construction barriers, foreign objects on the roadway (for instance, debris, animals, etc.), and in some cases illuminated objects. Of course, exposure times on the order of microseconds are too short to capture some illuminated objects, such as those that flicker according to a power grid or PWM (such as for LEDs), and thus some objects may be missed in these images, such as in the images 602 and 604 as well as images 610-618.

Again, to address this issue, images captured by the camera 350 may be processed to identify illuminated objects, and in particularly, those that flicker due to the frequency of the power grid or PWM as discussed above. At the same time, because an illuminated state of such flickering lights can be discerned from a single or very few images captured by a camera configured as camera 350 as demonstrated by image 620 of FIG. 6B, as compared to processing thousands if not tens of thousands of images captured by a camera configured as camera 300, this can save quite a bit of processing power. Moreover, even when camera 300 is able to capture such flickering light when the exposure time is longer, such as close to 10 milliseconds, because lighting conditions change and because the exposure time of camera 300 is variable, the likelihood of capturing such flickering lights consistently is very low. In addition, when considering the computing devices 110 must make driving decisions in real time, this makes the use of the ND filter and longer fixed (or in some examples, variable) exposure time for the camera 350 an incredibly useful tool that allows the computing devices 110 to "perceive" the vehicle's environment closer to how a person would.

The images captured by the camera themselves and/or information identified from those images may be provided to the computing devices 110 in order to assist the computing devices in making driving decisions for the vehicle. For instance, the status of a traffic signal, for instance solid illuminated or flashing (such as with a flashing yellow light), may be readily determined from the images from camera 350 and used to control how the vehicle responds to the traffic light. In another example, the status of an LED brake light, LED headlamp, LED lights of emergency vehicles, or LED turn signal light of another vehicle may be readily determined from the images from camera 350 and used to control how the vehicle 100 interacts with that other vehicle, such as waiting for the other vehicle to make a turn, moving around the other vehicle (if passing is possible), etc. Similarly, the text from a sign that utilizes LED lights to provide textual information, such as no-right-on-red signs, construction information boards, some speed limit signs, etc. may be readily recognized, for instance, using optical character recognition techniques (OCR). In many circumstances, allowing the computing device 110 to "understand" such text may make the computing devices more apt to respond to changing environments caused by construction, public safety notices, or other information provided on such LED lighted signs. Moreover, some of the images may be taken by two different cameras at the same time, making aligning the images and matching objects between them, etc. significantly simpler to do.

Figure 8:
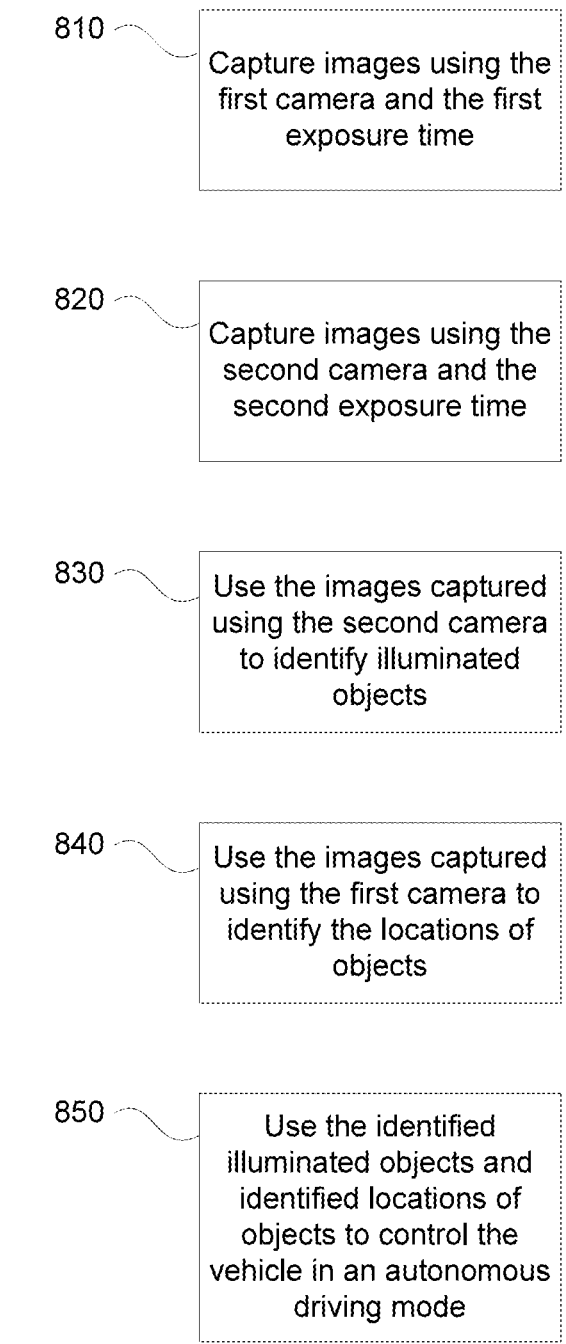
FIG. 8 is a flow diagram in accordance with aspects of the disclosure.

FIG. 8 is an example flow diagram 800 in accordance with some of the aspects described herein. The example flow diagram refers to a system including first and second cameras, such as cameras 300 and 350, respectively. In this regard, the first camera may be mounted on a vehicle, such as vehicle 100, in order to capture images of the vehicle's environment. The first camera has a first exposure time and being without an ND filter, where the first exposure is a variable exposure time that is adjusted according to ambient lighting conditions. The second camera may also be mounted on the vehicle in order to capture images of the vehicle's environment. The second camera has a second exposure time that is greater than or equal to the first exposure time and also has an ND filter. The second exposure time is a fixed (or in some examples, a variable) exposure time. The system also includes one or more processors, such as processors of controllers 302, 352 and of computing devices 110, which may be configured to perform the operations of flow diagram 800. For example, at block 810, the one or more processors capture images using the first camera and the first exposure time. At block 520, the one or more processors capture images using the second camera and the second exposure time. At block 830, the one or more processors use the images captured using the second camera to identify illuminated objects. At block 840, the one or more processors use the images captured using the first camera to identify the locations of objects. At block 880, the one or more processors use the identified illuminated objects and identified locations of objects to control the vehicle in an autonomous driving mode.

Although the examples above relate to controlling vehicles having an autonomous driving mode, identifying illuminated objects as described above may also be useful for other driving systems. For example, the information may be provided for display to passengers within such vehicles having autonomous driving modes to provide context about how the vehicle's perception system is perceiving the vehicle's environment. In another example, the information may be used to provide notifications or warnings to a driver of a vehicle which may be operating in a manual or semi-autonomous (less than fully autonomous driving mode), such as to provide a warning that the driver is going to go through a red light or another vehicle is braking or turning.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:
1. A method comprising:
  capturing images using a first camera and a first exposure time, the first camera being mounted in order to capture images of an environment, the first camera being without an ND filter;
  capturing images using a second camera and a second exposure time, the second camera being mounted in order to capture images of the environment, the second exposure time being greater than or equal to the first exposure time and having an ND filter;
  using the images captured using the second camera to identify illuminated objects;

using the images captured using the first camera to identify the locations of objects; and using the identified illuminated objects and identified locations of objects to control a vehicle in an autonomous driving mode.

2. The method of claim 1, wherein the first camera and the second camera each include a near infrared filter.

3. The method of claim 1, wherein the second exposure time is on the order of milliseconds.

4. The method of claim 3, wherein the second exposure time is at least 5 milliseconds and the first exposure time is no greater than 5 milliseconds.

5. The method of claim 1, wherein the ND filter is selected according to the second exposure time.

6. The method of claim 1, wherein the ND filter is implemented at a pixel level for the second camera.

7. The method of claim 1, further comprising, using the images of the second camera to identify illuminated images by identifying light from a PWM light source.

8. The method of claim 1, further comprising using the images of the second camera to identify illuminated images by identifying text generated by a plurality of PWM light sources comprising LEDs.

9. The method of claim 8, further comprising selecting the second exposure time based on a frequency of the PWM light sources.

10. The method of claim 1, further comprising using the images of the second camera to identify illuminated images by identifying light from a light source which flickers at a rate defined by a power grid that supplies power to the light source.

11. The method of claim 10, further comprising, selecting the second exposure time based on a rate defined by the power grid.

12. The method of claim 1, wherein the second exposure time is a fixed exposure time.

13. The method of claim 1, wherein the first exposure time is a variable exposure time, and the method further comprises adjusting the first exposure time according to ambient lighting conditions.

14. The method of claim 13, wherein the second exposure time is always greater than the first exposure time.

15. The method of claim 13, wherein the second exposure time is a variable exposure time.

16. The method of claim 1 wherein the second camera includes a set of photodiodes and the ND filter is arranged to filter light before the light reaches the set of photodiodes, and the method further comprises, exposing the set of photodiodes using a fixed exposure time of at least 5 milliseconds in order to capture an image, wherein the exposure time allows the camera to capture light from a PWM light source during the exposure time, the PWM light being located in an environment of the vehicle.

17. The method of claim 16, further comprising using a near-infrared filter arranged to filter light before the light reaches the set of photodiodes.

18. The method of claim 1, wherein the second camera includes a set of photodiodes, the ND filter is arranged to filter light before the light reaches the set of photodiodes, and the method further includes exposing the set of photodiodes using a fixed exposure time of at least 5 milliseconds in order to capture an image, wherein the exposure time allows the camera to capture light from a light source which flickers at a rate defined by a power grid that supplies power to the light source, the light source being located in an environment of the vehicle.

19. The method of claim 18, further comprising using a near-infrared to filter light before the light reaches the set of photodiodes.

* * * * *